United States Patent
Maltsev et al.

(10) Patent No.: US 8,064,828 B2
(45) Date of Patent: *Nov. 22, 2011

(54) TECHNIQUES FOR WIRELESS PERSONAL AREA NETWORK COMMUNICATIONS WITH EFFICIENT SPATIAL REUSE

(75) Inventors: Alexander Maltsev, Nizhny Novgorod (RU); Alex Kesselman, Ramat-Gan (IL); Roman Maslennikov, Nizhny Novgorod (RU); Alexey Khoryaev, Dzerhinsk (RU); Alexey Sevastyanov, Pavlovo (RU)

(73) Assignee: Intel Corporation, Santa Clara, CA (US)

( * ) Notice: Subject to any disclaimer, the term of this patent is extended or adjusted under 35 U.S.C. 154(b) by 1048 days.

This patent is subject to a terminal disclaimer.

(21) Appl. No.: 11/937,433

(22) Filed: Nov. 8, 2007

(65) Prior Publication Data

US 2009/0124199 A1 May 14, 2009

(51) Int. Cl.
*H04B 7/00* (2006.01)
*H04B 1/38* (2006.01)
*H01Q 15/14* (2006.01)

(52) U.S. Cl. ........ 455/41.2; 455/73; 455/63.1; 370/338; 342/367

(58) Field of Classification Search ................ 342/367; 370/338
See application file for complete search history.

(56) References Cited

U.S. PATENT DOCUMENTS

| 5,697,063 A | * | 12/1997 | Kishigami et al. | ............ 455/507 |
| 7,164,932 B1 | * | 1/2007 | Sato et al. | ................. 455/562.1 |

FOREIGN PATENT DOCUMENTS

| JP | 55-047743 | * | 4/1980 |
| JP | 8-84107 | * | 3/1996 |
| JP | 2001036454 A | * | 2/2001 |
| JP | 2002204240 A | * | 7/2002 |

OTHER PUBLICATIONS

"60 GHz WPAN Standardization within IEEE 802.15.3c", R. Fisher, International Symposium on Signals, Systems and Electronics, 2007. ISSSE '07, Aug. 27, 2007.*

* cited by examiner

*Primary Examiner* — Temesgh Ghebretinsae
*Assistant Examiner* — Gennadiy Tsvey
(74) *Attorney, Agent, or Firm* — Thorpe North & Western LLP

(57) ABSTRACT

An embodiment of the present invention provides an apparatus, comprising at least one transceiver operable in a wireless personal area network (WPAN), wherein the at least one transceiver is equipped with the directional antennas adapted to point substantially vertically towards a horizontal reflecting surface, such as a ceiling, and with an antenna pattern specifically designed to control the interference levels.

9 Claims, 1 Drawing Sheet

TECHNIQUES FOR WIRELESS PERSONAL AREA NETWORK COMMUNICATIONS WITH EFFICIENT SPATIAL REUSE

BACKGROUND

The millimeter-wave (mmWave) wireless personal area networks (WPAN) communication systems operating in the 60 GHz frequency band are expected to provide several Gbps throughput to distances of about 10 m and will be entering into service in a few years. Currently, several standardization bodies (IEEE 802.15.3c, WirelessHD SIG, ECMA TG20) consider different concepts of the mmWave WPAN systems to define the systems which are the best suited for the multi-Gbps WPAN applications.

For the traditional WPAN approach, the signal is radiated isotropically or directionally to receiver as it is schematically shown in FIG. 1, generally as 100. With this approach, the signal level of the given WPAN transmitter decreases with the distance increase as a $1/R^2$ (free space approximation—only 6 dB attenuation increase as the distance doubles) or under similar polynomial law. So if the number of the WPAN users are significant and they are located close to each other, the mutual interference and the frequency reuse problems are prevalent.

Thus, a strong need exists for an invention that remedies the aforementioned shortcomings of existing WPAN systems, apparatus and methods.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
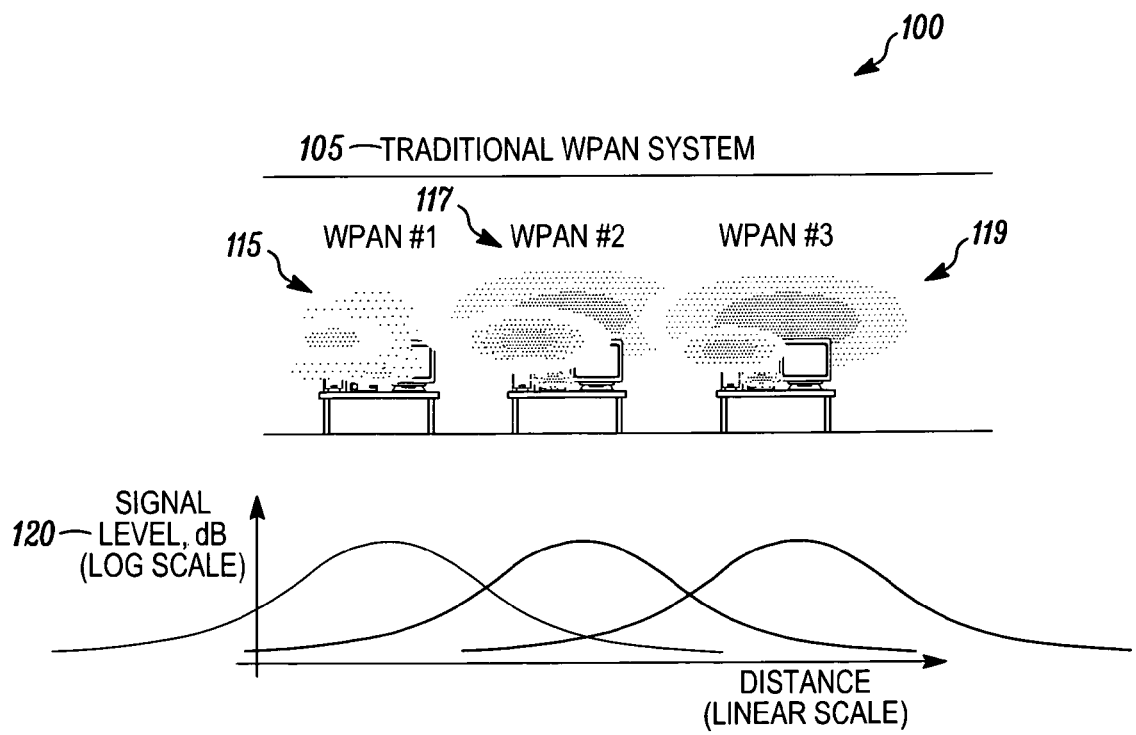
FIG. 1a illustrates a general WPAN system.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Wireless Personal Area Network (WPAN) communication systems are extensively used for data exchange between devices over short distances of no more than 10 meters. Current WPAN systems may exploit the frequency band in the 2-7 GHz frequency band region and achieve throughputs of up to several hundred Mbps (for Ultra-WideBand systems).

For a traditional WPAN approach, the signal is radiated isotropically or directionally to a receiver as it is schematically shown generally at 100 in FIG. 1(a). With this traditional approach 105, the signal level 120 of the given WPAN transmitters 115, 117, 119 decreases with the distance increase as a $1/R^2$ (free space approximation—only 6 dB attenuation increase as the distance doubles) or under similar polynomial laws. So if the number of the employees is significant and they are located close to each other, the mutual interference and the frequency reuse problems become pervasive.

The total bandwidth of the unlicensed mmWave spectrum in 60 GHz region is 7 GHz and the proposed channelization schemes for mmWave WPAN may use more than 2 GHz for each channel and a total of 3 channels will be available. So considering different WPANs as cells in a hexagonal structure shows that not adjacent WPANs may have different frequency channels, but the WPAN which may be located after the adjacent WPAN should reuse the same frequency. As the different WPANs are located close to each other, the level of interference from the WPANs operating at the same frequency may become a limiting factor. It has already been reported that the small number of the frequency channels may restrict the use of the mmWave WPANs in wireless docking station applications.

An embodiment of the present invention provides a WPAN which may allow control and significant attenuation of the interference level for the mmWave WPAN relative to the case of the isotropic (or horizontally directional) signal radiation—although the present invention is not limited in this respect. To do so, in an embodiment of the present invention, the mmWave transceivers are equipped with the directional antennas generally pointed in the vertical direction so that they signals may reflect off a reflective surface (such as, but not limited to, towards the ceiling with the antenna pattern specifically designed to control the interference level). Although not limited to this scenario, it has been demonstrated that the typical office ceiling surface has good reflections properties—although it is understood that the present invention is not limited any particular usage environments. So the propagation loss between any transmitter and receiver pair for a given WPAN will be low because both devices are pointed towards the ceiling and the signal path will be most likely free of obstacles. The block diagram of the proposed scheme is shown as 10 of FIG. 1(b) with WPAN 1 125, WPAN 2 127, WPAN 3, 129.

Figure 1B:
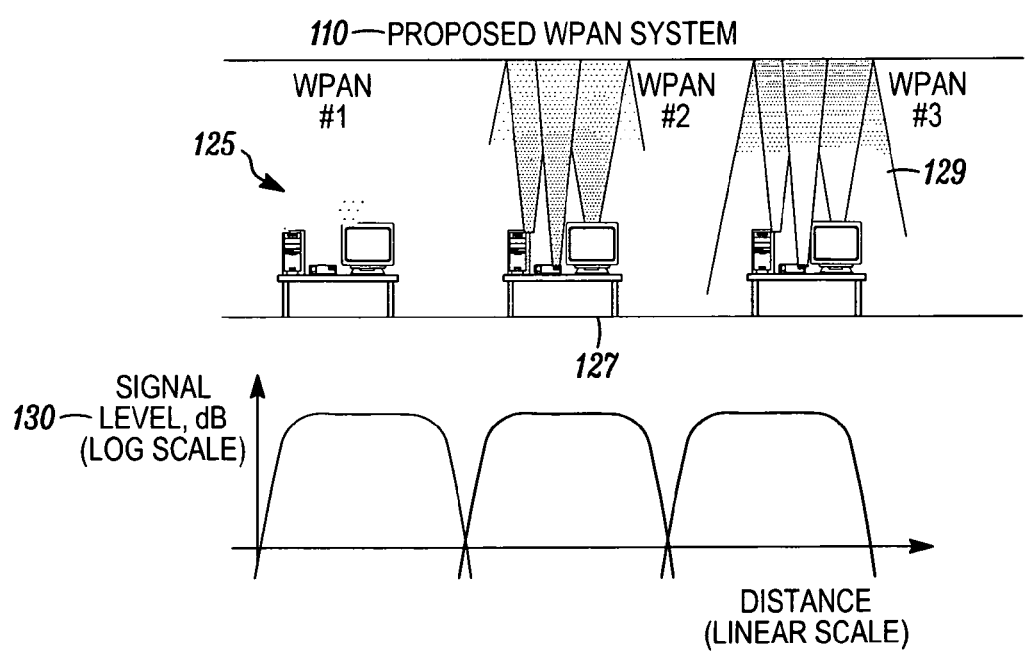
FIG. 1b shows a WPAN system of an embodiment of the invention.

In an embodiment of the present invention, the antenna pattern may be designed so that the reflected signal will cover a required area of the given WPAN and reduce significantly interference for the adjacent WPANs. For example, and not by way of limitation, if a Gaussian antenna pattern is used, then the electromagnetic field distribution produced by such antenna is also Gaussian in the far field. Thus, with the distance increase, the field has an exponential attenuation of the power density—i.e. the linear attenuation in dB scale as shown in FIG. 1(b) at 130 which can not be achieved for polynomial law attenuation utilized in previous systems. So the interference level for the proposed WPANs can be made substantially lower than for the traditional WPAN. Thus a large number of WPAN networks may be deployed densely with using e.g., 3 frequency channels or only one (or 2) frequency channels—although the present invention is not limited in this respect.

As stated above, utilizing embodiments of the present invention allows efficient frequency reuse which is important for the upcoming mmWave WPAN systems because the number of the available frequency channels currently is only 3 and some applications of the technology, such as, but not limited to, wireless docking stations, require setting-up multiple WPAN networks operating closely to each other. Further, strong multi-path is not likely to happen for the present invention because only one main reflector is used. Thus the simplified baseband implementation may be used for reduced equalization complexity, coding complexity and others. This will reduce cost and will probably allow use of the same device for both mmWave WPAN and kiosk applications, to name a few.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
    at least one transceiver operable in a wireless personal area network (WPAN), wherein said at least one transceiver is equipped with directional antennas radiating in a vertical direction towards a horizontal reflective surface and with an antenna pattern specifically designed to control interference levels; and
    wherein said horizontal surface is a ceiling and said antenna pattern is configured for a signal to be reflected off said ceiling and cover a required area of said WPAN and reduce interference for adjacent WPANs.

2. The apparatus of claim 1, wherein said at least one transceiver is a millimeter (mm) Wave transceiver.

3. The apparatus of claim 1, wherein said antenna pattern reduces inter-symbol interference (ISI) to enable a simplified baseband implementation to reduce equalization complexity and coding complexity.

4. A method, comprising:
    operating a transceiver in a wireless personal area network (WPAN) and using directional antennas to transmit towards a ceiling with an antenna pattern specifically designed to control the interference level; and
    wherein said antenna pattern is configured for a signal to be reflected off said ceiling and cover a required area of said WPAN and reduce interference for adjacent WPANs.

5. The method of claim 4, further comprising operating said transceiver in a millimeter (mm) Wave frequency band.

6. The method of claim 4, wherein said antenna pattern reduces inter-symbol interference (ISI) to enable a simplified baseband implementation to reduce equalization complexity and coding complexity.

7. A system for wireless personal area network communications, comprising:
    a plurality of transceivers associated with a plurality of devices operable in a wireless personal area network (WPAN), wherein said transceivers are equipped with directional antennas radiating substantially vertically toward a horizontal reflecting surface with the antenna patterns specifically designed to control the interference levels when said plurality of devices are communicating with each other via said transceivers; and
    wherein said plurality of transceivers are a millimeter (mm) Wave transceiver and said horizontal surface is a ceiling.

8. The system of claim 7, further comprising additional adjacent WPANs and wherein said antenna patterns are configured for a signal to be reflected off said ceiling and cover a required area of said WPAN and reduce interference significantly for said additional adjacent WPANs.

9. The system of claim 8, wherein said signal pattern enables a simplified baseband implementation to reduce equalization complexity and coding complexity.

* * * * *